United States Patent
Zhao et al.

(10) Patent No.: US 10,343,950 B2
(45) Date of Patent: Jul. 9, 2019

(54) GLASS BUBBLES AND LOW DENSITY SHEET MOLDING COMPOUND INCORPORATING SAID GLASS BUBBLES

(71) Applicant: FORD GLOBAL TECHNOLOGIES, LLC, Dearborn, MI (US)

(72) Inventors: Haibo Zhao, Northville, MI (US); Daniel Quinn Houston, Dearborn, MI (US); Rick H. Wykoff, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/783,535

(22) Filed: Oct. 13, 2017

(65) Prior Publication Data
US 2018/0037496 A1      Feb. 8, 2018

Related U.S. Application Data

(62) Division of application No. 14/696,521, filed on Apr. 27, 2015, now Pat. No. 9,809,493.

(51) Int. Cl.
| | |
|---|---|
| B24B 31/02 | (2006.01) |
| C03C 19/00 | (2006.01) |
| C08K 7/28 | (2006.01) |
| B29C 70/66 | (2006.01) |
| C03C 23/00 | (2006.01) |
| C03C 11/00 | (2006.01) |
| B29K 509/08 | (2006.01) |

(52) U.S. Cl.
CPC .............. *C03C 19/00* (2013.01); *B24B 31/02* (2013.01); *B29C 70/66* (2013.01); *C03C 11/002* (2013.01); *C03C 23/006* (2013.01); *C08K 7/28* (2013.01); *B29K 2509/08* (2013.01)

(58) Field of Classification Search
None
See application file for complete search history.

(56) References Cited

U.S. PATENT DOCUMENTS

| | | | | |
|---|---|---|---|---|
| 189,422 | A | * | 4/1877 | Bogardus .................. F41J 1/01 |
| | | | | 273/362 |
| 3,365,315 | A | * | 1/1968 | Beck ..................... C03B 19/107 |
| | | | | 264/31 |
| 4,277,522 | A | * | 7/1981 | Dorfeld ................... C03C 17/00 |
| | | | | 427/292 |

(Continued)

FOREIGN PATENT DOCUMENTS

| | | |
|---|---|---|
| CN | 203171413 U | 9/2013 |
| CN | 103865295 A * | 6/2014 |

(Continued)

OTHER PUBLICATIONS

English Machine Translation of CN203171413U.

*Primary Examiner* — Peter A Salamon
(74) *Attorney, Agent, or Firm* — Ray Coppiellie; King & Schickli, PLLC (57) ABSTRACT

A glass bubble includes a hollow glass body having an outer surface with a diameter of between about 16 micrometers and about 25 micrometers and a surface roughness of about 0.01% to about 0.1% of that diameter. A low density sheet molding compound incorporating a plurality of glass bubbles and resin is also disclosed.

5 Claims, 6 Drawing Sheets

(56) References Cited

U.S. PATENT DOCUMENTS

| | | | | |
|---|---|---|---|---|
| 4,328,967 A * | 5/1982 | Orlando | ............... | B29C 31/041 264/299 |
| 4,540,629 A * | 9/1985 | Sands | ..................... | B01J 13/04 264/13 |
| 4,615,763 A * | 10/1986 | Gelorme | ................. | C23C 18/22 216/33 |
| 4,745,139 A * | 5/1988 | Haasl | ................... | C09D 153/00 106/36 |
| 5,412,003 A * | 5/1995 | Akiyama | ................ | C08K 7/28 428/430 |
| 7,845,409 B2 * | 12/2010 | Shinbach | ............. | E21B 43/267 166/280.2 |
| 8,261,577 B2 * | 9/2012 | Qi | ........................ | C03C 11/002 264/13 |
| 9,266,764 B2 * | 2/2016 | Qi | ........................ | C03C 11/002 |
| 2004/0134230 A1 * | 7/2004 | Kodas | ................ | A61K 6/0276 65/17.2 |
| 2004/0245089 A1 * | 12/2004 | Lawson | ............... | C23C 14/564 204/192.1 |
| 2008/0210664 A1 * | 9/2008 | Uenishi | ................ | B01D 65/02 216/67 |
| 2013/0267630 A1 * | 10/2013 | Han | ........................ | C08K 7/28 523/219 |
| 2016/0340236 A1 * | 11/2016 | Zhao | ...................... | B29C 70/66 |

FOREIGN PATENT DOCUMENTS

| | | |
|---|---|---|
| WO | 2012151178 A2 | 11/2012 |
| WO | 2013019875 A1 | 2/2013 |

* cited by examiner

GLASS BUBBLES AND LOW DENSITY SHEET MOLDING COMPOUND INCORPORATING SAID GLASS BUBBLES

This is a divisional patent application claiming priority to U.S. patent application Ser. No. 14/696,521, now U.S. Pat. No. 9,809,493, filed on 27 Apr. 2015, the full disclosure of which is incorporated herein in its entirety by reference.

TECHNICAL FIELD

This document relates generally to a surface treatment method for glass bubbles, glass bubbles manufactured by that method and low density sheet molding compound made utilizing glass bubbles manufactured by that method.

BACKGROUND

The government's corporate average fuel economy (CAFE) requirement of 54.5 mpg by 2025 has pushed motor vehicle manufacturers to accelerate the use of lightweight materials in motor vehicles. As a result, it has been proposed to utilize low density sheet molding compounds in the construction of vehicle body panels, such as the hood, instead of standard density sheet molding compounds. More specifically, low density sheet molding compounds have a density of about 1.2 g/cm$^3$ while standard density sheet molding compounds have a density of about 1.9 g/cm$^3$. The key weight reduction in the formulation of low density sheet molding compounds versus standard density sheet molding compounds is replacing the $CaCO_3$ component of the standard sheet molding compounds with low density glass bubbles.

One of the technical challenges faced in this effort is the low interfacial properties between glass bubbles and resin. More specifically, the smooth/hard surface of the glass bubbles causes weak bonding of the bubbles to the resin matrix which has a tendency to substantially decrease the overall mechanical performance of low density sheet molding compound.

This document relates to a new and improved surface treatment method for glass bubbles which functions to roughen the surface of the glass bubbles so as to allow for better adhesion to the resin.

SUMMARY

In accordance with the purposes and benefits described herein, a method is provided for treating the outer surfaces of a plurality of glass bubbles. That method may be broadly described as comprising the steps of: (a) loading a plurality of glass bubbles into a processing vessel having a roughened lining and (b) displacing the processing vessel so that the plurality of glass bubbles move against the roughened lining and thereby roughen the outer surfaces.

In one possible embodiment, the method includes spinning and rotating the processing vessel. More specifically, the method may include spinning the processing vessel at a speed of between about 60 rpm and about 600 rpm and rotating the processing vessel at a speed of between about 60 rpm and about 600 rmp where the spinning and rotating are provided along two different axes. The method also includes reversing the direction of the spinning and the rotating of the processing vessel. In one possible embodiment, the processing vessel has a spherical shape. In another possible embodiment, the processing vessel has a cylindrical shape.

Still further, the method may include providing the plurality of glass bubbles with an outer surface roughness of about 0.01% to about 0.1% of the diameter of the plurality of glass bubbles. Still further, in one possible embodiment, the method may include subjecting the plurality of glass bubbles to an air plasma treatment. This may be done by moving the plurality of glass bubbles through an air plasma stream using a vibrating conveyor belt, moving the plurality of glass bubbles through an air plasma stream on a slide or dropping the plurality of glass bubbles through an air plasma stream. In any of these embodiments, the method includes subjecting the plurality of glass bubbles to an air plasma temperature of between about 23° C. and about 500° C.

In one possible embodiment, the air plasma treatment is completed after treating the plurality of glass bubbles in the processing vessel. In one possible embodiment, the glass bubbles are only treated mechanically in the processing vessel. In another possible embodiment, the glass bubbles only receive an air plasma treatment.

In accordance with an additional aspect, a method is provided for treating the outer surfaces of a plurality of glass bubbles comprising the step of subjecting the plurality of glass bubbles to an air plasma treatment so as to provide an outer surface roughness of about 0.01% to about 0.1% of the diameter of the plurality of glass bubbles.

In accordance with yet another aspect, a glass bubble is provided wherein that glass bubble comprises a hollow glass body having an outer surface of a diameter of between about 16 μm and about 25 μm and a surface roughness of about 0.01% to about 0.1% of that diameter. Still further, a low density sheet molding compound is provided comprising a resin and a plurality of glass bubbles as set forth and just described.

In the following description, there are shown and described several preferred embodiments of the method and the glass bubble product of the method. As it should be realized, the method and product are capable of other, different embodiments and their several details are capable of modification in various, obvious aspects all without departing from the method and product as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method and product of the method and together with the description serve to explain certain principles thereof. In the drawing figures.

Reference will now be made in detail to the present preferred embodiments of the method, examples of which are illustrated in the accompanying drawing figures.

DETAILED DESCRIPTION

Figure 1A:
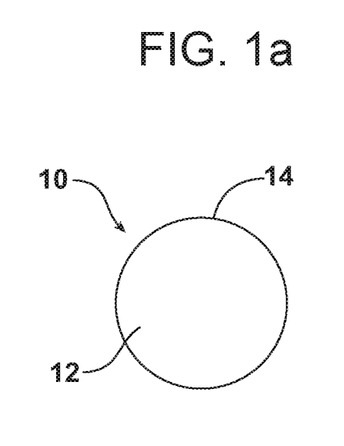
FIGS. 1a and 1b are schematic representations illustrating a glass bubble with an original smooth surface and the same glass bubble with a roughened surface after undergoing the method of surface treatment described herein.
Figure 1B:
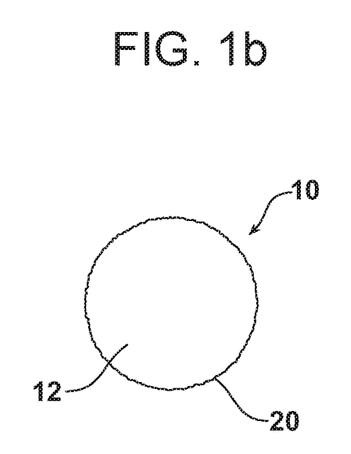

Reference is now made to FIG. 1a illustrating a single glass bubble 10 comprising a hollow body 12 and a smooth outer surface 14. As shown in FIG. 1b, after being subjected to the method of treating that outer surface, the glass bubble 10 includes a hollow outer body 12 with a roughened outer surface 20. In one useful embodiment, the treated glass bubble 10 has a diameter of between about 16 μm and about 25 μm and a surface roughness of about 0.01% to about 0.1% of that diameter: that is, a surface roughness of between 160 nm to 2500 nm. A plurality of surface treated glass bubbles 10 as disclosed have a density of about 1.2 g/cm³. Further, the roughened outer surface 20 has the desired interfacial interaction with a resin to provide a low density sheet molding compound with desired mechanical properties and performance when used as a motor vehicle panel component.

Figure 2A:
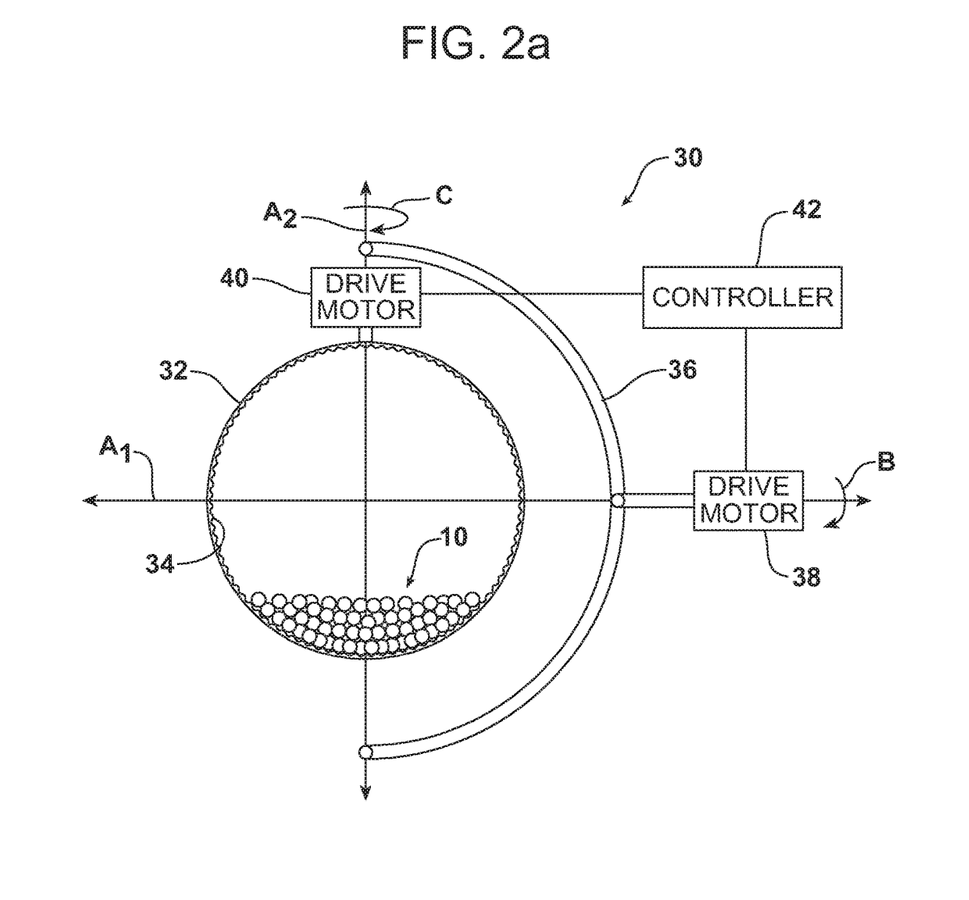
FIG. 2a is a schematic illustration of one possible embodiment of a device for subjecting glass bubbles in a spherical container with a roughened inner surface to rotation and spinning along two different axes $A_1$, $A_2$.
Figure 2B:
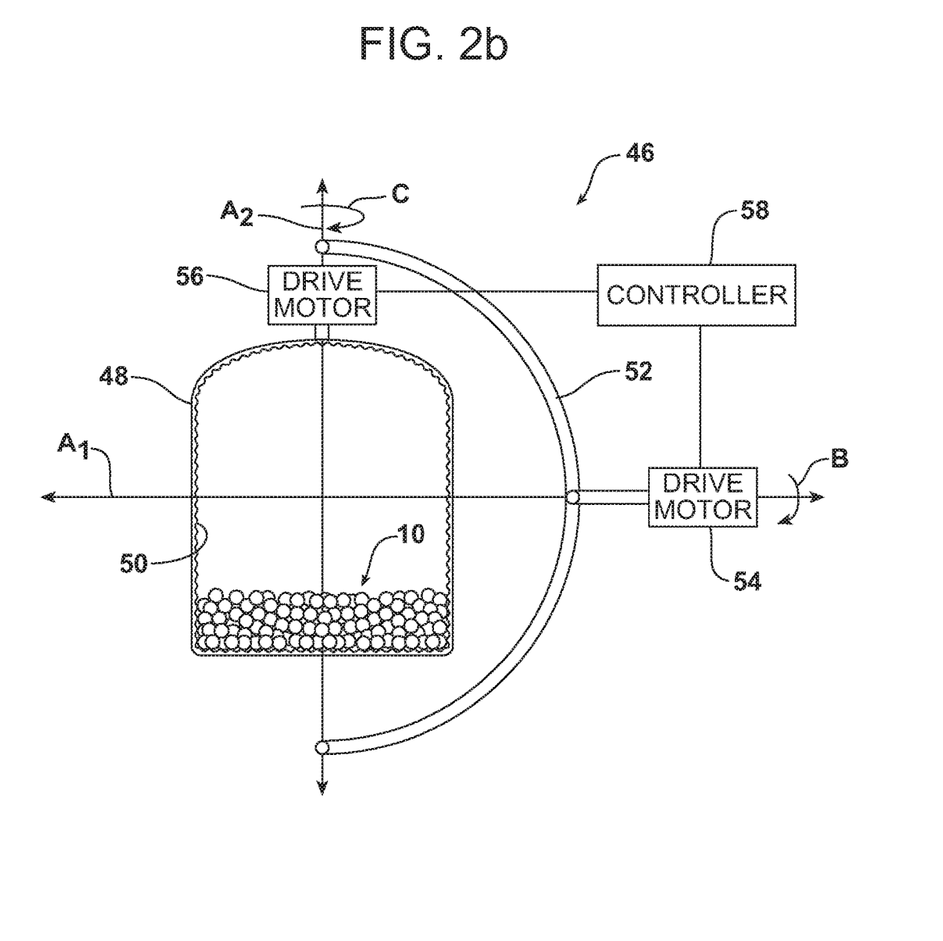
FIG. 2b is a view similar to FIG. 2a but showing an alternative embodiment wherein the processing vessel is cylindrical in shape.
Figure 3A:
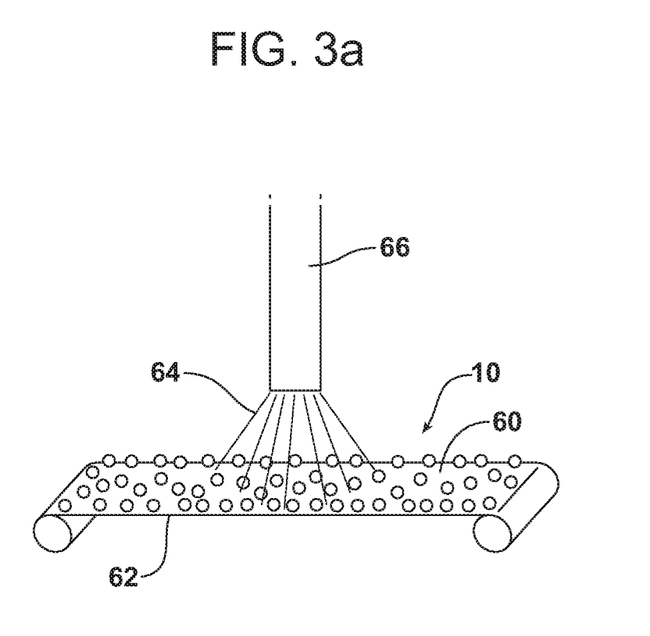
FIG. 3a is a schematic illustration of one possible way to subject a plurality of glass bubbles to an air plasma treatment utilizing a vibrating conveyor belt.
Figure 3B:
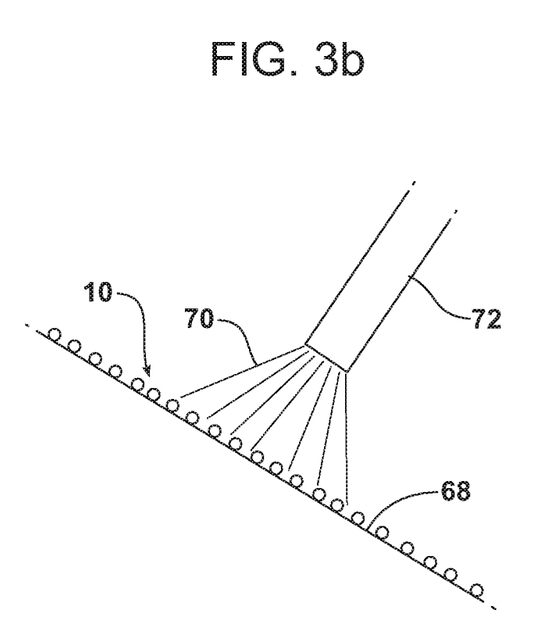
FIG. 3b is a schematic view illustrating an alternative embodiment wherein the glass bubbles are subjected to air plasma treatment while rolling down a ramp or a slide.
Figure 3C:
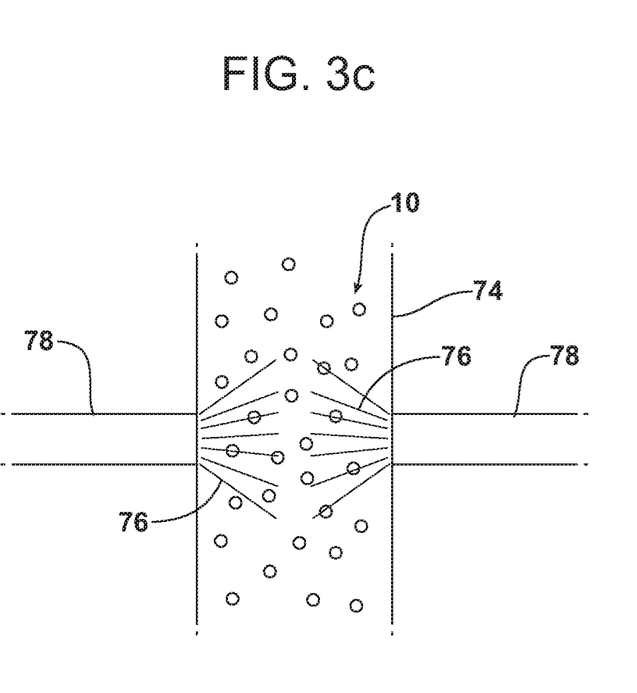
FIG. 3c is a schematic illustration of another embodiment wherein a plurality of glass bubbles subjected to an air plasma treatment by dropping and falling through a tube.

In order to achieve the desired roughening of the glass bubble surface 20, the glass bubbles may be subject to roughening in a spinning and rotating processing vessel as illustrated in FIGS. 2a and 2b, or air plasma treatment as illustrated in FIGS. 3a-3c or both.

FIG. 2a illustrates one possible embodiment of a device 30 for processing the glass bubbles 10. The device 30 includes a processing vessel 32 of spherical shape that has a roughened internal lining 34. The processing vessel 32 is supported at two opposed points by means of the yoke 36. A drive motor 38 rotates (see action arrow B) the yoke 36 and, therefore, the processing vessel 32 about a first axis $A_1$. A second drive motor 40 is carried on the yoke 36 and functions to spin the processing vessel 32 about a second axis $A_2$ (see action arrow C). In the illustrated embodiment, the first axis $A_1$ and the second axis $A_2$ are substantially perpendicular to each other.

A controller 42 connected to the two drive motors 38, 40 allows the speed of the drive motors to be set and changed as desired during the processing of the glass bubbles 10. The goal is to ensure that the entire outer surface of the plurality of glass bubbles 10 are roughened consistently throughout so as to provide an outer surface roughness of about 0.01% to about 0.1% of a diameter of the plurality of glass bubbles. Toward this end, the processing vessel 32 may be spun about axis $A_1$ at a speed of between about 60 rpm and 600 rpm while being rotated about axis $A_2$ at a speed of between about 60 rpm and 600 rpm. The controller 42 also allows the direction of spinning and the direction of rotating of the processing vessel 32 to be reversed as desired. Thus, for example, the processing vessel 32 may be rotated by the drive motor 38 in a first direction at a speed of between 60 and 600 rpm for a first period of time of, for example, from five to sixty seconds and then rotated in a second direction at a speed of between 60 and 600 rpm for a second period of time of, for example, from five to sixty seconds. Similarly, the processing vessel 32 may be spun by the drive motor 40 in a third direction at a speed of between 60 and 600 rpm for third period of time of, for example, from five to sixty seconds and then spun in a fourth direction at a speed of between 60 and 600 rpm for fourth period of time of, for example, from five to sixty seconds. The rotating and spinning and the periods of time may be sequential or overlapping. The reversing of direction aids in ensuring that the outer surface 20 of the glass bubbles 10 receive consistent overall roughening.

FIG. 2b illustrates a device 46 similar to the device 30 illustrated in FIG. 2a. The device 46 includes a processing vessel 48 having a roughened lining 50, a yoke 52, a first drive motor 54, a second drive motor 56 and a controller 58. The two devices 30, 46 operate identically, the only difference is the processing vessel 48 in the second device 46 is cylindrical in shape rather than spherical in shape.

Reference is now made to FIGS. 3a-3c illustrating three different devices for providing an air plasma treatment to the glass bubbles 10. In the embodiment illustrated in FIG. 3a, the glass bubbles 10 are positioned on a face 60, of a vibrating conveyor belt 62. Accordingly, the glass bubbles 10 bounce up and down as they move along the vibrating conveyor belt 62 through an air plasma stream 64 emanating from the overlying plasma probe 66.

As illustrative FIG. 3b, the glass bubbles 10 roll down an incline, slide or ramp 68 through a plasma stream 70 emanating from the overlying plasma probe 72.

In the embodiment illustrated in FIG. 3c, the glass bubbles 10 fall or drop through the tube 74 falling through the air plasma stream 76 emanating from the opposed plasma probes 78. In any of the air plasma treatment embodiments illustrated in FIGS. 3a-3c, the glass bubbles 10 are subjected to air plasma temperatures of between about 23° C. and about 500° C. and undergo an increase in surface energy that enhances their chemical bonding to a resin such as used in the production of a sheet molding compound. This increases the overall mechanical performance of a part made from that low density sheet molding compound thereby making the parts useful as panels such as hoods or the like in a motor vehicle.

With the unique size and shape of glass spheres, the above three treatment processes are specially designed to allow for a full surface treatment. The bouncing, sliding and falling movements ensure that the glass bubbles have full exposure to the plasma stream. A full surface treatment imparts better mechanical properties and performance to the glass bubbles than a partial treatment.

In summary, numerous benefits result from the surface treatment method disclosed in this document whether that method comprises only processing the glass bubbles 10 in the spinning and rotating processing vessels 32, 48 illustrated in FIGS. 2a and 2b, only processing the glass bubbles by means of the air plasma treatments illustrated in FIGS. 3a-3c or subjecting the glass bubbles to both rotating and spinning in the processing vessel and air plasma treatment.

By increasing the roughness and/or surface energy of the surface 20 of the treated glass bubbles 10, chemical bonding between the glass bubbles and any resin used to make low density sheet molding compounds is enhanced thereby providing those sheet molding compounds with superior mechanical properties allowing their use as various panel components of a motor vehicle. This advantageously allows the production of lower weight motor vehicles which are characterized by increased fuel economy. Accordingly, the method disclosed herein and the resulting glass bubbles and low density sheet molding compound products made using the glass bubbles 10 with the roughened surfaces 20 represents a significant advance in the art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A glass bubble, comprising:
an air plasma treated hollow glass body having an outer surface with a diameter of between about 16 micrometers and about 25 micrometers and a surface roughness of about 0.01% to about 0.1% of said diameter, wherein air plasma treatment provides a surface energy to enhance chemical bonding of the hollow glass body.

2. A low density sheet molding compound, comprising a resin and a plurality of glass bubbles as set forth in claim 1.

3. A glass bubble, comprising:
an air plasma treated hollow glass body having an outer surface with a diameter of between 16 micrometers and 25 micrometers and a surface roughness of 0.01% to 0.1% of said diameter, wherein air plasma treatment provides a surface energy to enhance chemical bonding of the hollow glass body.

4. A low density sheet molding compound, comprising a resin and a plurality of air plasma treated glass beads, each of said plurality of air plasma treated glass beads consisting of an air plasma treated hollow glass body having an outer surface with a diameter of between 16 micrometers and 25 micrometers and a surface roughness of 0.01% to 0.1% of said diameter, wherein air plasma treatment provides a surface energy to enhance chemical bonding between the plurality of glass beads and the resin.

5. The low density sheet molding compound of claim 4 having a density of about 1.2 g/cm$^3$.

* * * * *